United States Patent Office 3,422,030
Patented Jan. 14, 1969

3,422,030
ALKYL PHENYL PHOSPHITE INHIBITORS FOR ALKYLATED PHENOLS
Charles P. Riley, Jr., Chelmsford, Mass., assignor to National Polychemicals, Inc., Wilmington, Mass., a corporation of Massachusetts
No Drawing. Filed May 11, 1966, Ser. No. 549,189
U.S. Cl. 252—400
Int. Cl. B01j 1/16
9 Claims

ABSTRACT OF THE DISCLOSURE

A composition composed of a eutectic comelt of an alkylated phenol and an alkyl phenyl phosphite.

My invention concerns a means for inhibiting the discoloration of hindered phenolic compounds, and particularly low melting point comelt mixtures of a primary antioxidant such as a hindered phenol and secondary antioxidant such as a thioester. In particular my invention relates to a method of preventing discolorization on storage of butylated hydroxy toluene.

A wide variety of polymers which are subject to degradation require the addition during the polymerizing process, or thereafter, of one or more antioxidants. Such polymers often include natural and synthetic elastomers as well as thermoplastics, and particularly those polymers which contain processing or catalytic residues therein and which are subject to rapid degradation in color or physical properties upon use or exposure to oxygen. It is common practice to include in such polymers small antioxidant amounts of from about 0.001 to 5.0 percent by weight or more of one or more antioxidant additives.

Typically, a primary antioxidant additive is employed in such polymers in combination with a secondary antioxidant additive. The secondary antioxidant additive is usually employed in excess over the primary antioxidant additive often in an amount ranging from about 1 to 1 to 1 to 5. The combination of antioxidants may be added to the polymer at the same or different times. The primary antioxidant is added in theory to serve as a free radical terminator and, therefore, to prevent the loss of desirable properties in the polymer. However, the use of a primary antioxidant such as a hindered phenol alone is often not sufficient, and one or more secondary antioxidants such as thioesters are employed to remove by reduction or otherwise any hydroperoxides which might be formed by the primary antioxidant and to reduce the peroxides to inert compounds. The hindered phenols employed as the primary antioxidants are commonly alkylated phenols or methylene or thio-bis alkylated phenols or similar high-weight solid antioxidant compounds. The thioesters, such as thiodipropionic acid esters, usually have a lower molecular weight and correspondingly lower melting points.

Hindered phenols are usually characterized by a white, light or off-white color, but exhibit a tendency to yellow and darken in color on aging. This is particularly true if the material is stored at elevated temperatures of 25° C. or greater. Any yellowing or darkening in color reduces the overall aesthetic appearance of the antioxidant to the user, and may give rise to color problems when used in colorless, white or light-colored polymers. For example, butylated hydroxy toluene (BHT), a commonly used antioxidant, is normally available as a white solid, but turns yellow on aging either when used alone or in admixture or comelts with other antioxidant additives.

It is often desirable to form a mixture of a hindered phenol and the thioester and to then incorporate the mixture into the polymer at the appropriate time. However, such mixtures often present a difficult handling problem in polymer plants, particularly during hot weather, since the lower melting point product tends to sinter in such mixtures. Such sintering or the tendency of the powdered low-melting particles to stick together during hot weather is particularly troublesome when the additive is employed in automatic handling equipment. I have found that blends of hindered phenols and thioesters can be melted together to form low-melting point mixtures or comelts. These comelts can be liquid or solid, depending upon temperature of use, the relative melting points of the components, and the amount of the components in the comelt. Such low-melting comelts are advantageous since they insure the proper proportioning of the primary and secondary antioxidants and inhibit segregation of the antioxidant components. I have found that blends of butylated hydroxy toluene (BHT) and a lauryl thiodipropionic acid ester form a eutectic mixture of very low-melting point (29–33° C.). Such a eutectic mixture permits the combination of the ingredients to be handled as a liquid upon gently heating or during periods of hot weather, and to be pumped and metered in a much more efficient manner than with the separate addition of solid compounds. Such liquid eutectic mixtures avoid the sintering problems experienced with such low-melting thioester compounds. However, I have also discovered that such comelts have on testing shown a pronounced tendency to yellow upon shelf aging due to the presence of the hindered phenol.

I have found that the tendency of hindered phenols, such as butylated hydroxy toluene or admixtures or comelts of hindered primary antioxidants and secondary thio-antioxidants to yellow or darken upon aging may be inhibited or prevented by the addition of an organic phosphite. Typically, color degradation is prevented by the addition of a small but color-inhibiting amount of from 0.01 to 10 percent by weight of a white or light-colored organic phosphite. Such addition to a hindered phenol or a stabilizing co-blend containing a hindered phenol is usually sufficient to extend significantly the storage life of the hindered phenol or the mixture without discoloration or at least retard further discoloration. The advantages of my discovery are particularly important to the usually white antioxidants like BHT and to those low-melting point eutectic mixtures which combine the advantages of nondiscoloration and liquid metering of the additive to the polymer. Although small amounts of organic phosphite are sufficient to prevent discoloration, the hindered phenols and mixtures thereof may contain an excess of the same or different organic phosphite. For example, the organic phosphite may perform another function such as a stabilizing additive in the resulting polymer. It is, therefore, possible by my invention to provide a unique stabilizing mixture comprising a primary antioxidant or a primary and a secondary antioxidant together with an organic phosphite such as trisnonyl phenol phosphite.

The components of my stabilizing mixture may, therefore, vary widely in amounts depending upon the protection desired and the resulting polymer to which the antioxidant mixture is to be incorporated, as well as the form of the comelt desired, i.e., liquid or solid. For example, my primary and secondary antioxidants may be combined in amounts ranging from about 5 to 95 percent of the mixture, while the organic phosphite may range from about 0.1 to 95 percent of the mixture although 0.05 to 10.0 percent is generally sufficient for stabilizing the antioxidant. In general, the secondary antioxidant may range from about a 1 to 1 to 1 to 5 ratio over the primary antioxidant, although this may be varied where the polymer already contains the same or a different antioxidant or where additional amounts of a rather low-melting compound is desired in the mixture in order to form a eutectic mixture. Those colorless, white, off-white or light-colored antioxidants and organic phosphites that are commonly employed in industry are suitable for and may be incorporated in my compositions.

Those antioxidant mixtures which form liquids, particularly upon the application of gentle heat or during the hot summer months, are particularly desirable. A comelt should have a melting point of less than about 50° C. to be advantageous, and particularly low-melting compositions of less than 35° C. are preferred. My stabilized antioxidant compositions may contain other additives useful for incorporation into the polymer, such as for example, fillers, pigments, carbon black, plasticizers, solvents, oils, waxes, amines, glycols, polyglycols, curing agents, accelerators, heat stabilizers, antiozonants, blowing agents, scorch inhibitors, and other additives. If desired other low-melting inert additives as carriers may be incorporated to lower or control the melting point of the comelt.

Typical primary antioxidants which may be stabilized and employed in my stabilizing mixtures include those sterically hindered phenols commonly or usefully employed as antioxidants which are subject to discoloration on aging, storage or heat. Typical hindered phenols would include alkylated phenols such as those containing one or more lower alkyl groups, e.g., $C_1$–$C_4$ groups like a tertiary butyl group in the 6 position, as well as those alkalene-bis alkylated phenols such as the 2, 2'-alkylene-bis-4,6 dialkyl phenols, or other such hindered phenols. Specific examples include 2,6 ditertiary butyl paracresol, 2,2' methylene bis (4-methyl-6-tertiary butyl) phenol and 2-tertiary butyl-paracresol and the like, and combinations thereof. Typical hindered phenols and antioxidant mixtures are described in U.S. Patents 2,538,355, 3,069,369, 3,103,501, 3,149,093 and others.

Typical secondary antioxidants which may be employed include organic thio compounds such as thioesters, thioalkanonic acids, organic sulfides and disulfides. Common thioesters employed would include dithiodipropionic acid and its salts, particularly the oil soluble salts formed by reaction with polyglycols or fatty alcohols. Specific compounds include the fatty acid esters and mixed esters of thiodipropionic acid such as dilauryl thiodipropionate (melting point 39–40° C.), distearyl thiodipropionate (melting point 55–56° C.), and mixed laurel-stearyl thiodipropionate.

Any organic phosphite may be employed in my stabilizing mixtures to inhibit or prevent discoloration. The preferred organic phosphites include those which are now commonly employed in stabilizers and readily available, as well as those approved for use by the Food and Drug Administration. Such organic phosphites may include trialkylaryl, trialkyl, triaryl, dialkylaryl and diarylalkyl, as well as hydroxy-hydrocarbon-substituted and other organic phosphites. Other phosphites include phosphorus-containing polymers such as ester phosphites and phosphite polymers prepared by the reaction of a phenolic phosphite with formaldehyde or by the reaction of a phenol-formaldehyde novolak with a trivalent phosphorous compound such as phosphorus trichloride. These later phosphite polymers are more fully described in a copending application Ser. No. 462,385 filed June 8, 1965. Other phosphite polymers include those prepared from bisphenol A, pentaerythritol, glycols and polyglycols.

Specific phosphites include the $C_8$–$C_{12}$ alkyl phenyl phosphites such as trisnonyl phenyl phosphite, as well as diisodecyl nonyl phenyl phosphite, triphenyl phosphite, tridecyl phosphite, diphenyldecyl phosphite, didecylphenyl phosphite, and trisoctyl phenyl phosphite. In addition, I have found that the presence in any stabilizing composition of from about 5 to 50 percent by weight of a borate based on the phosphite-borate amount further inhibits color degradation. Typical borates which include hydrocarbon-substituted borates like phenyl, alkyl and mixed alkyl-phenyl and alkyl-substituted phenyl borates such as tributyl borate, triphenyl borate, diphenyl butyl borate, and 2,6,di-tertiary-butyl-4-methyl phenyl di-butyl borate. Borates when incorporated in the stabilizing mixture of the antioxidant and the phosphite are effective in further preventing discoloration. Typical borate and organic phosphites for use in stabilizing mixtures are described more particularly in U.S. Patent 3,244,662.

The advantages of my invention may be shown by examples illustrating the stabilization of a typical commercially used primary antioxidant of butylated hydroxy toluene (BHT) and a comelt of BHT and a secondary antioxidant dilauryl thiodipropionate (DLTDP). The butylated hydroxy toluene (BHT) is a white solid having a melting point of about 69° C., while the secondary antioxidant DLTDP melts at approximately 40° C. The DLTDP is a sticky, waxy solid which tends to sinter in hot weather.

EXAMPLE 1

The color properties of butylated hydroxy toluene alone and with an organic phosphite additive at room temperature and at a higher temperature were observed with the results shown in Table I.

TABLE I.—BHT-TRISNONYLPHENYLPHOSPHITE STABILITY DATA

| Sample material | Days at room temperature (20–25° C.) | Days at 50° C. | Sample color at at end of test time |
| --- | --- | --- | --- |
| BHT (no additive) | 7–10 | 2 | Yellow. |
| BHT (0.10% by weight of trisnonylphenyl phosphite). | 15 | 15 | White (no discoloration). |
| BHT (0.50% by weight of trisnonylphenyl phosphite). | 15 | 15 | Do. |

EXAMPLE 2

A 1 to 1 mixture of the primary (BHT) and a secondary antioxidant (DLTDP) was melted together to form a eutectic composition having a low melting point in the range of from about 29 to 32° C. No significant change in the melting point of this BHT–DLTDP mixture was found in the range of from 1 to 1 to 1 to 3 of primary to secondary antioxidant. The low melting point mixture, thus, can be handled in liquid form. Non-discoloring comelts of these two products are most desirable. Such a comelt was tested with and without the addition of an organic phosphite as follows:

TABLE II.—BHT AND DLTDP BLENDS 1:1 PLUS TRISNONYLPHENYLPHOSPHITE

| Trisnonylphenylphosphite concentration, percent | Days at room temperature (20–25° C.) | Days at 50° C. (molten) | Sample color |
| --- | --- | --- | --- |
| 3.0 | 56 | 56 | White. |
| 1.0 | 44 | 44 | Do. |
| 0.5 | 39 | 39 | Do. |
| 0.1 | 39 | *17 | Do. |
| None | | 2 | Yellow. |

*Started to yellow after 17 days at 50° C. Room temperature sample did not yellow through 39 days.

The data of Table II demonstrates that the addition of an organic phosphite to the antioxidant comelt completely inhibits color formation for an extended time period, while the comelt product remains white in color in both solid and molten form.

My stabilizing mixtures are useful for incorporation into a wide variety of polymers particularly where clear, white or light-colored polymers are desired. Typical polymers in which my compositions may be used include natural, and synthetic elastomers like natural rubber, copolymers of styrene and butadiene, nitrile polymers such as butadiene-acrylonitrile copolymers, as well as acrylonitrile-butadiene-styrene polymers, polybutadiene, polyisoprene, natural rubber, carboxylated elastomers, ethylene-propylene rubbery copolymers and diene modified terpolymers and the like. Other polymers include polyesters, acrylic resins, polycarbonates, polyamides, urethane resins, styrene resins such as high-impact polystyrene and styrene-modified resins and vinyl resin such as vinyl halide like polyvinyl chloride and copolymers of vinyl chloride with vinyl acetate and the like. Other thermoplastics in particular include olefinic resins such as polyethylene, polypropylene, ethylene-propylene copolymers, ethylene-butene copolymers, and the like.

My invention has been described with particular reference to the prevention of color change of alkylated phenols for use as antioxidants. However, organic phosphites may be employed to prevent color degradation of alkylated phenols regardless of the particular use of the color stabilized composition.

What I claim is:

1. A color stabilized composition useful as an additive to polymers which composition consists essentially of a eutectic comelt of a hindered alkylated phenol subject to change in color properties with time and 0.1 to 10% by weight of an $C_8$–$C_{12}$ alkyl phenyl phosphite.

2. The composition of claim 1 wherein the alkylated phenol is butylated hydroxy toluene and the phosphite is trisnonylphenyl phosphite.

3. The composition of claim 1 which includes from about 5 to 50 percent by weight of a borate selected from the group consisting of phenyl, lower alkyl, mixed lower alkyl-phenyl, and lower alkyl substituted phenyl borates, the weight based on the total amount of the phosphite and borate in the composition.

4. The composition of claim 1 which includes a higher fatty acid ester of thiodipropionic acid, the ester and alkylated phenol being present in a rate of from about 1.1 to 5.1.

5. The composition of claim 1 which is a eutectic mixture characterized by a melting point of from about 29 to 32° C., wherein the alkylated phenol is butylated hydroxy toluene, and which includes a lauryl ester of thiodipropionic acid.

6. The composition of claim 4 wherein the phosphite is trisnonyl phenyl phosphite.

7. The method of preventing the color degradation of a hindered alkylated phenol which method comprises:
adding to the alkylated phenol a .1 to 10% by weight of $C_8$ to $C_{12}$ alkyl phenyl phosphite and which includes the step of forming a eutectic comelt mixture having a melting point of from about 29 to 32° C. by adding a lauryl ester of thiodipropionic acid.

8. The method of claim 7 wherein the alkylated phenol is a butylated hydroxy toluene and the organic phosphite is trisnonylphenyl phosphite.

9. The method of forming a comelt which comprises heating a hindered alkylated phenol, .01 to 10% by weight of a C8–C12 alkyl phenyl phosphite and an ester of thiodipropionic acid to the melting point.

References Cited

UNITED STATES PATENTS 3,345,326 10/1967 Chang et al. _____ 260—45.75

FOREIGN PATENTS 1,294,998 4/1962 France.

LEON D. ROSDAL, *Primary Examiner.*

I. GLUCK, *Assistant Examiner.*

U.S. Cl. X.R.

252—404, 406; 260—45.75, 45.85, 49.95, 814